United States Patent [19]

Collins et al.

[11] 4,157,201

[45] Jun. 5, 1979

[54] PICK-UP TRUCK CAMPER DOOR ASSEMBLY

[75] Inventors: John M. Collins, Elkhart, Ind.; Charles T. Mountain, Orchard Lake, Mich.

[73] Assignee: Leer, Inc., Elkhart, Ind.

[21] Appl. No.: 830,026

[22] Filed: Sep. 2, 1977

[51] Int. Cl.$^2$ .............................................. B60P 3/32
[52] U.S. Cl. ...................................... 296/156; 49/477
[58] Field of Search .................. 296/23 MC, 23 R; 105/18, 20; 49/477, 475

[56] References Cited

U.S. PATENT DOCUMENTS

| 3,410,226 | 11/1968 | Kropp | 105/18 |
| 3,638,991 | 2/1972 | Hathaway | 296/23 MC |
| 3,837,700 | 9/1974 | Van Slyke | 296/23 MC |
| 3,853,348 | 12/1974 | Bjork et al. | 296/23 MC |
| 3,897,970 | 8/1975 | Gattenby | 296/23 MC |

Primary Examiner—Joseph F. Peters, Jr.
Assistant Examiner—Gene A. Church
Attorney, Agent, or Firm—Harness, Dickey & Pierce

[57] ABSTRACT

A door assembly for providing access between the interior of a pick-up truck passenger compartment or cab and the interior of a camper enclosure mounted on the load-carrying bed of the truck; the door assembly including a one-piece generally rectangular shaped door frame extending substantially the entire height of the cab interior and secured around the periphery thereof to the rearward side of the cab, a door hingedly mounted along a generally vertically extending axis so as to be movable between a closed position arranged generally coplanar with the rearward side of the cab and an open position extending outwardly into the camper compartment, a first sealing element extending between the door frame and the camper enclosure, and a second sealing element cooperable with the first element and sealingly engageable with the door when it is in its closed position.

14 Claims, 9 Drawing Figures

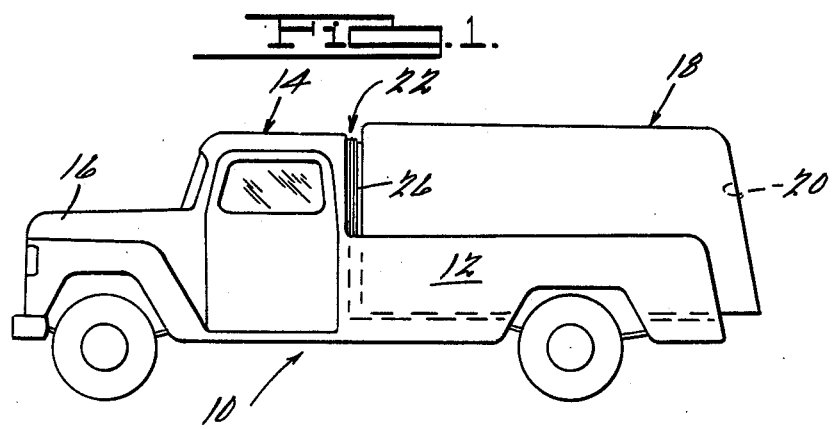
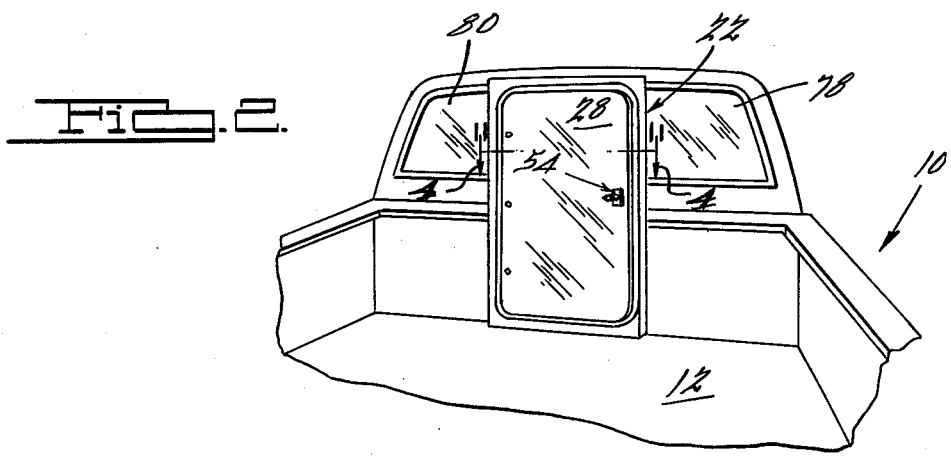
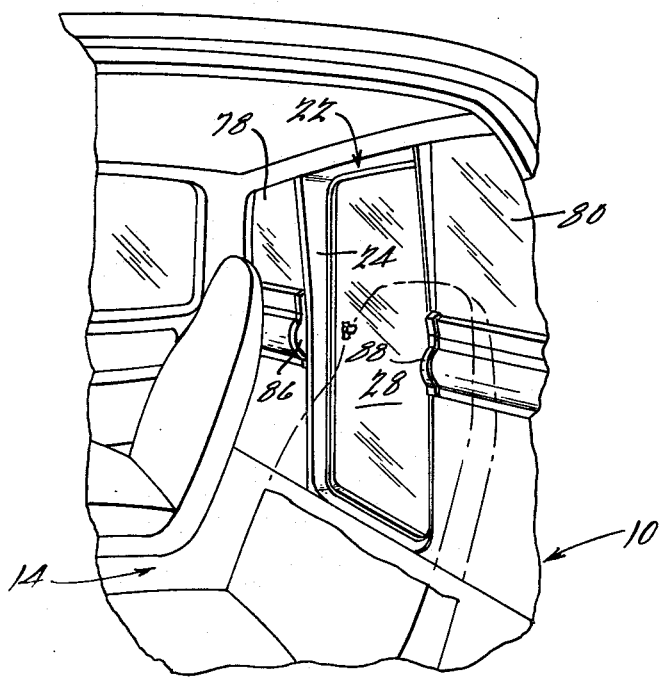

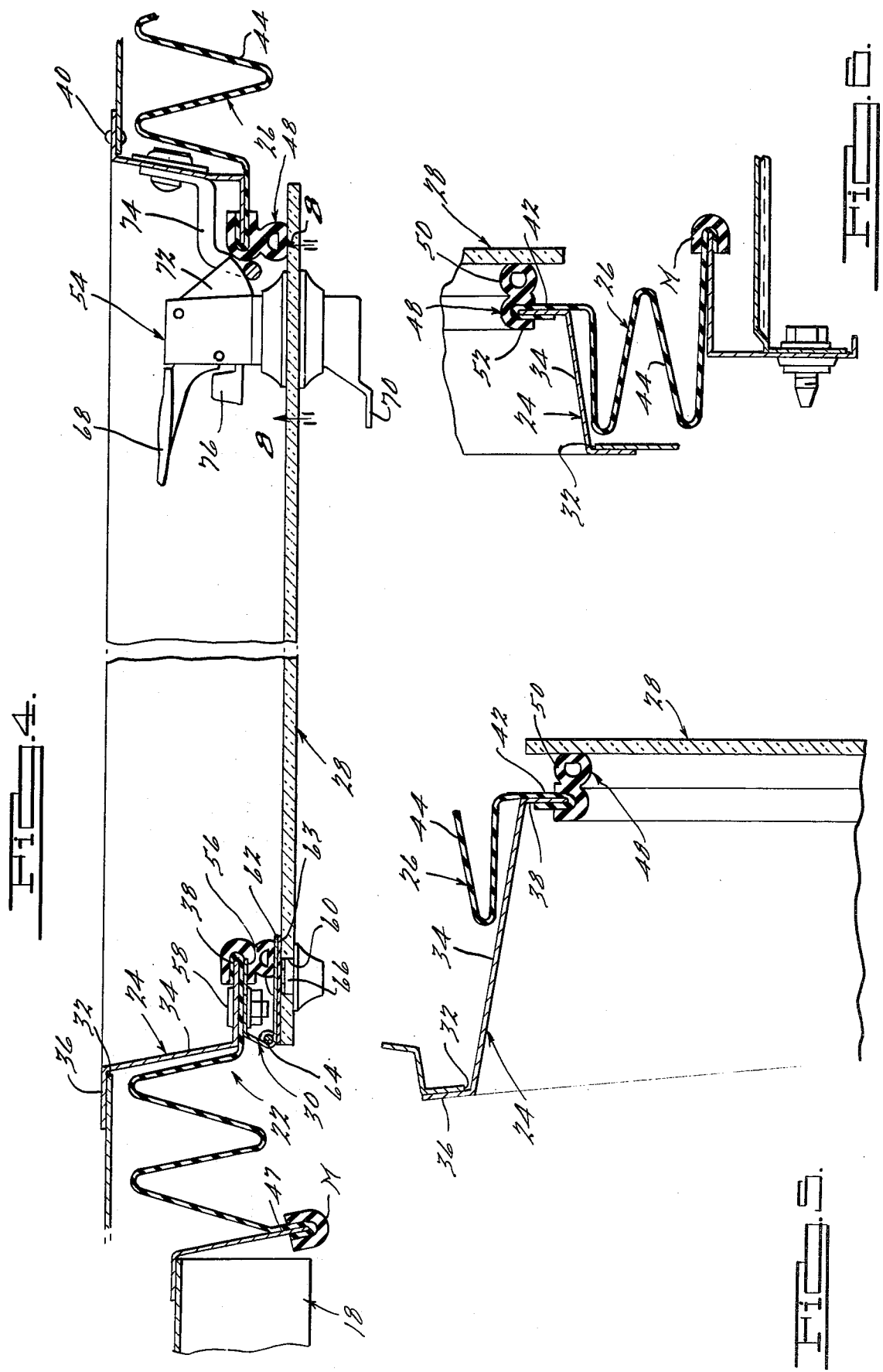

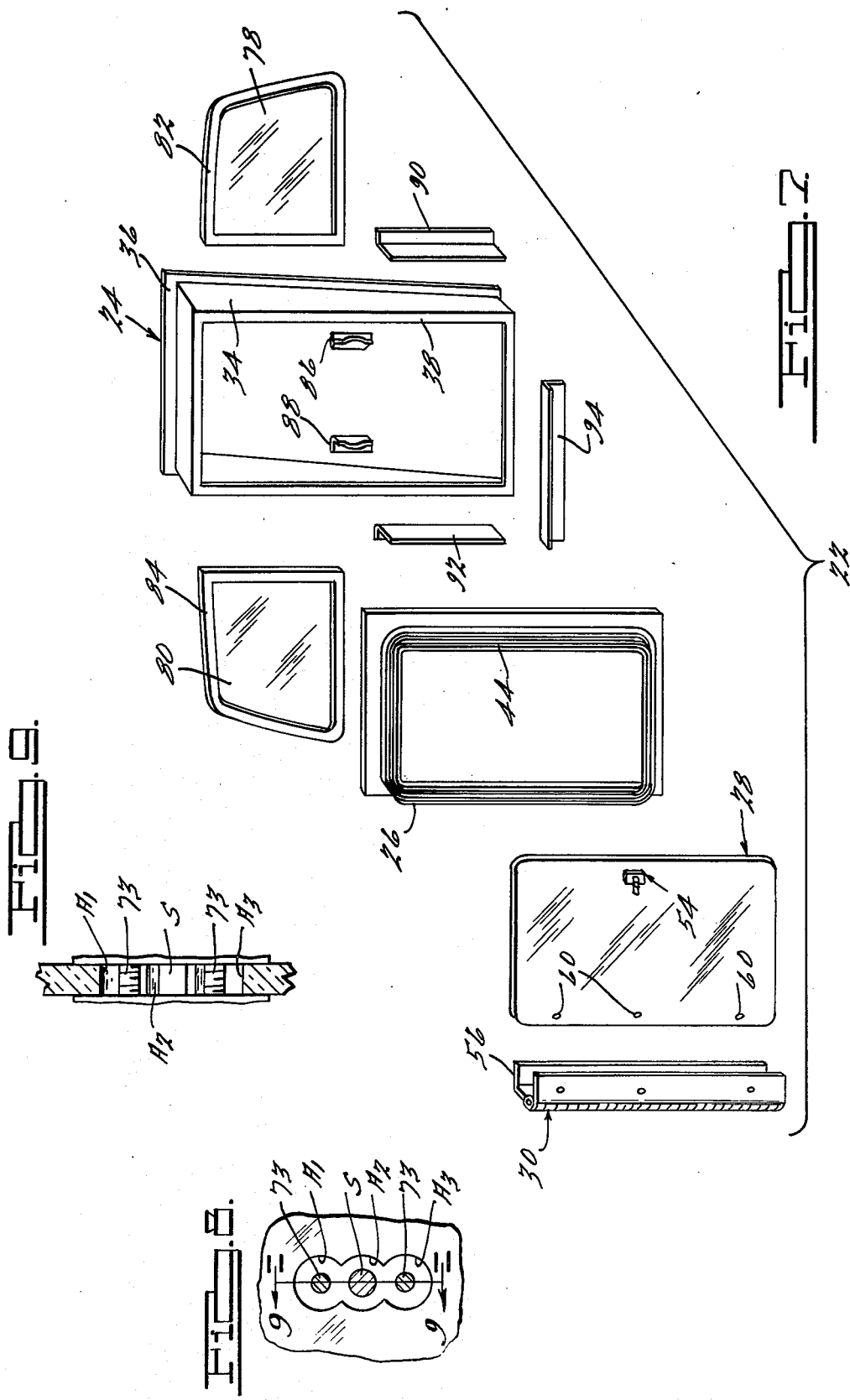

PICK-UP TRUCK CAMPER DOOR ASSEMBLY

BACKGROUND OF THE INVENTION

The present invention relates generally to pick-up truck type vehicles which are provided with camper enclosures that cooperate with the load-carrying bed of the vehicle to provide a camper compartment. Specifically, the invention is concerned with a new and improved door assembly which is adapted to be mounted on the rearward side of the passenger cab of a pick-up truck to provide for the transfer of passengers, articles, etc. between the interior of the passenger compartment and the interior of the camper compartment. Such door assembly is intended to permit communication between the interior of the camper and the interior of the passenger compartment both during traveling and when the vehicle is at rest, whereby the space available within the passenger compartment and the interior of the camper compartment can be more readily utilized without necessitating that persons be required to move exteriorly of the vehicle when going between the passenger and camper compartments.

One of the problems associated with such door assemblies relates to the fact that relative movement occurs between the vehicle cab and the load-carrying bed and hence a relatively flexible seal is necessitated in order to assure against the ingress of moisture, noise, odors, etc., without any portion of the door assembly being rigidly interconnected between the cab and the camper. Another problem which is encountered in the provision of such doorways is the fact that it is necessary to cut certain portions of a rearward side of a passenger compartment away, with the result that the cab may undergo a loss of certain structural integrity. Additionally, of course, is the fact that in order to provide convenient installation of the entire door assembly, such installation must not require radical rebuilding of either the passenger cab, load-carrying bed or require extensive welding or other relatively difficult installation techniques.

The present invention is intended to provide a new and improved door assembly which satisfies each of the aforesaid requisites and hence provides a door assembly that is not only esthetically pleasing and structurally sound, but which can be installed with a minimum amount of time and effort. In particular, the present invention utilizes a door assembly incorporating a stamped metal one-piece door frame which is intended to be fixedly secured by suitable screws, bolts, rivets or the like to the structural portion of the cab, thus obviating the need for any welding operations or the like. Extending between the door frame and the associated camper enclosure is a one-piece accordian-like bellows which provides for relative movement between the camper and the cab, yet assures against the ingress of objectionable moisture, odors, noise, etc.. The door assembly of the present invention utilizes a one-piece transparent tempered glass door which is pivotally mounted so as to be movable into the camper compartment when in the open position and thereby not interfere with the space normally occupied by the driver and passenger within the vehicle cab. Additionally, the door is engageable with a seal arrangement which provides an effective weather-tight seal around the periphery of the door and serves a secondary purpose of fixedly securing the adjacent edge of the bellows to the door frame in a manner so as to obviate need for any mechanical attachment, bonding, etc., as will herein be described in detail.

SUMMARY OF THE INVENTION

The present invention relates generally to pick-up truck type vehicles, and more particularly, to pick-up truck vehicles of the type having a camper enclosure mounted on the load-carrying bed thereof. Specifically, the present invention is directed toward a new and improved door assembly that is adapted to be mounted in the rearward side of the passenger compartment or cab of a pick-up type truck to provide for access between the interior of the passenger compartment and the interior of a camper enclosure that is mounted on the load-carrying bed of the truck.

It is accordingly a general object of the present invention to provide a new and improved door assembly adapted to be mounted on a pick-up type truck for providing access between the interior of the passenger compartment or cab and the interior of a camper enclosure mounted on the truck.

It is a more particular object of the present invention to provide a new and improved door assembly of the above character which is extremely simple to install with readily available tools and materials.

It is a further object of the present invention to provide a new and improved door assembly of the above described type which embodies a one-piece stamped metal door frame member that is adapted to be fixedly secured along one edge thereof to the structural portion of the pick-up cab, whereby to structurally reinforce the cab.

It is another object of the present invention to provide a new and improved door assembly, as above described, which incorporates a bellows-type seal that is secured along one edge thereof to the associated door frame by means of a unique door seal arrangement that is operatively engageable with the door to provide a moisture and air-resistant seal therebetween.

It is another object of the present invention to provide a new and improved door assembly of the above described type which utilizes a one-piece door that is fabricated of a tempered transparent glass.

It is a further object of the present invention to provide a new and improved door assembly for a pick-up truck type vehicle wherein the door frame may be installed without requiring any welding and which provides access along the entire height of the cab between the interior of the cab and the interior of the associated camper enclosure.

It is yet another object of the present invention to provide a new and improved door assembly of the above described type wherein the door is hingedly mounted so as to be movable between a closed position and an open position extending outwardly into the interior of the camper enclosure and thus not detract or interfere with the space normally provided within the passenger compartment.

It is a further object of the present invention to provide a new and improved door assembly of the above described type wherein the bellows-type seal is adapted to extend between the interior of the passenger compartment and the interior of the associated camper enclosure, whereby to provide a positive seal against moisture, noises, odors, etc.

Other objects and advantages of the present invention will become apparent from the following detailed description taken in conjunction with the accompanying drawings.

BRIEF DESCRIPTION OF THE DRAWINGS

FIG. 1 is a side elevational view of a pick-up truck type vehicle having an associated camper enclosure and an exemplary embodiment of the door assembly of the present invention in operative assocation therewith;

FIG. 2 is an elevated fragmentary perspective view looking at the rearward side of the passenger compartment of the truck shown in FIG. 1 and illustrates the door assembly of the present invention in its operative position therein;

FIG. 3 is an elevated fragmentary perspective view of the door assembly of the present invention, as seen from the interior of the passenger compartment of the truck shown in FIGS. 1 and 2;

FIG. 4 is an enlarged fragmentary cross-sectional view taken substantially along line 4—4 of FIG. 2;

FIG. 5 is an enlarged fragmentary cross-sectional view of the upper end of the door assembly of the present invention;

FIG. 6 is a fragmentary cross-sectional view of the lower end of the door assembly of the present invention;

FIG. 7 is an exploded assembly view of the door assembly of the present invention;

FIG. 8 is an enlarged cross-sectional view of a portion of the door latch incorporated in the door assembly of the present invention, and FIG. 9 is a fragmentary cross-sectional view taken substantially along the line 9—9 of FIG. 8.

DETAILED DESCRIPTION OF A PREFERRED EMBODIMENT

Referring now in detail to the drawings and in particular to FIG. 1 thereof, a pick-up truck type vehicle, generally designated by the numeral 10, is shown as comprising a load-carrying bed section 12, a passenger compartment or cab 14, and an engine compartment 16. By the way of example, the vehicle 10 is shown as being provided with a camper type enclosure 18 which covers or encloses the bed section 12 of the vehicle 10 and defines a camper compartment 20 therewith. In accordance with the principles of the present invention, the vehicle 10 is provided with a door assembly, generally designated by the numeral 22, which is disposed within the rearward wall of the passenger compartment 14 and is adapted to enable passengers, articles, etc. to be moved between the interior of the passenger compartment 14 and the interior of the camper compartment 20, and vice versa, as will hereinafter be described in detail.

Generally speaking, the door assembly 22 comprises a one-piece stamped metal door frame, generally designated by the numeral 24, which is adapted to be fixedly secured to the rearward wall of the passenger compartment 14. In addition to the frame 24, the assembly 22 comprises a flexible bellows-type seal assembly 26 which is adapted to be fixedly secured to the door frame 24 at one edge portion thereof and to the associated camper enclosure 18 at the opposite edge thereof, whereby to provide for a weather-tight seal therebetween and provide for the relative movement which occurs between the load-carrying bed section 12 and cab 14 in typical pick-up truck vehicles. Additionally, the assembly 22 comprises a hingedly mounted door, generally designated 28, which is preferably fabricated of a transparent tempered glass and is hingedly mounted via a hinge mechanism 30 so as to be movable between a closed position arranged generally coplanar of the rearward side of the passenger compartment 14, and an open position wherein the door 28 extends interiorly of the camper compartment 20.

Generally speaking, the door assembly 22 is adapted to fit within a rectangular shaped opening 32 that is formed in the rearward side of the passenger compartment 14 of the vehicle 10. Typically, the upper end of such opening is provided by the rear window of the vehicle 10 which is removed preparatory to mounting the assembly 22, the lower end of the opening 32 being provided by cutting or otherwise removing a portion of the sheet metal of the rearward side of the passenger compartment 14 and a correlative portion of the forward panel of the bed section 12 of the vehicle 10. As will hereinafter be described, the aforementioned rear window of the vehicle 10 is replaced by a pair of window sections which are located on the laterally opposite sides of the door assembly 22.

As best seen in FIGS. 4 through 6, the door frame 24 comprises a rearwardly extending jamb section 34 which is suitably inclined or profiled to accommodate for the shape of the rearward side of the passenger compartment 14 and extends continuously around the entire rectangular opening 32 within which the door assembly 22 is mounted. The inner or forward end of the jamb section 34 is formed with an integral laterally outwardly extending flange section 36, while the outwardly or rearward end of the jamb section 34 is formed with a laterally outwardly extending flange section 38. Means in the form of suitable screws, bolts, rivets or the like 40 are utilized for securing the inner flange 36 to the interior side of the sheet metal of the rearward side of the passenger compartment 34, as shown in FIG. 4. Typically, such fastening means 40 would consist of "pop" rivets of the type well known in the art.

The bellows assembly 26 which extends between the rearwardmost portion of the door frame 24 and the adjacent portion of the camper enclosure 18 is fabricated of a flexible weather-resistent material, such as rubber, vinyl, or the like, and is provided with a generally U-shaped edge portion 42 which is adapted to be surmounted upon the outer flange 38 of the door frame 24. The edge portion 42 is integrally connected to an accordian folded intermediate portion 44, the rearwardly extending edge of which is also formed with a generally U-shaped or reversely folded section 46 that is adapted to be surmounted upon a suitable flange member or the like 47 secured to the camper enclosure 18. Means in the form of a suitable U-shaped molding M is preferably surmounted over the U-shaped section 46 to fixedly secure the same to the flange 47 and thereby provide a moisture and air-tight seal between the bellows assembly 46 and the associated structural portions of the camper enclosure 18.

In accordance with one of the important features of the present invention, the U-shaped edge portion 42 of the bellows assembly 46 is adapted to be fixedly secured to the flange section 38 of the door frame 24 by means of an elongated sealing member 48 which, together with securing the bellows assembly 26 to the door frame 24, provides an air and moisture-tight seal when engaged with the forward surface or side of the door 28, as best seen in FIGS. 4 through 6. The door seal 48 generally comprises a door engaging section 50 which is of circular cross section and is adapted to be relatively deformable or compliant so that upon movement of the door 28 to the closed position, the rearward side of the section 50 will be deformed to the position or shape shown in FIG. 6 to provide the desired seal with the confronting surface of the door 28. The door seal 48 also includes a generally U-shaped clamping section which is formed integrally of the section 50 and is designated by the numeral 52. The clamping section 52 is adapted to be surmounted over the U-shaped edge portion 42 of the bellows assembly 26 and fixedly secure the bellows to the flange section 38 of the door frame 24, as well as fixedly secure the door engaging section 50 in operative position upon the door frame 24. Preferably, the interior of the clamping section 52 is provided with inclined teeth or barbs, whereby once the door seal 48 is installed upon the flange 38, both the bellows and seal 48 will be secured against inadvertant disassembly.

As best seen in FIG. 7, the door 28 is provided with a latch assembly 54 along one side thereof and is secured along the opposite edge thereof to the aforementioned hinge mechanism 30. In particular, the hinge mechanism 30 comprises a first flange section 56 which is secured by suitable screws, bolts or the like 58 to the flange 38 of the door frame 24. The door 28 is formed with a plurality of openings 60 by which the door 28 may be secured to a second flange section 62 of the hinge mechanism 30 via suitable screws, bolts or the like 66. The flange section 62 is preferably insulated from the glass from which the door 28 is fabricated by suitable gasket means 63, and a suitable hinge pin 64 is utilized for hingedly or pivotedly connecting the flange sections 62, 56 and hence hingedly connecting the door 28 upon the door frame 24.

Referring now to FIGS. 8 and 9, the door latch assembly 54 generally comprises an inner latch mechanism 66, located on the side of the door 28 confronting the passenger compartment 14, and an outer, preferably key operated, door latch 70 which is located on the opposite or rearward side of the door 28 from the latch mechanism 68. The latch mechanisms 68, 70 are operable to effect retraction of a latch 72 which is cooperable with a locking bar 74 secured to the adjacent portion of the door frame 24, with means in the form of a suitable locking lever 76 being provided on the interior side of the door 28 for security purposes. As best seen in FIGS. 8 and 9, the latch mechanisms 68, 70 are secured to one another via suitable screws, bolts or the like 73 which extend through two of three overlapping and thus connected apertures $A_1$, $A_2$, and $A_3$ formed in the door 28. A suitable operating shaft S extends through the center aperture $A_2$ and operatively connects the inner latch mechanism 68 with the outer latch mechanism 70 in a manner well known in the art.

As previously mentioned, a pair of rear windows 78 and 80 are cooperable with the door assembly 22 for sealing the portion of the rearward side of the cab or passenger compartment 14 once the door assembly 22 has been installed. Typically, the windows 78, 80 are provided with peripheral weather-tight seals 82, 84 which cooperate with the adjacent portions of the passenger compartment 14 to operatively support and provide a weather-tight seal around the periphery of the windows 78, 80.

The door assembly 22 is preferably cooperable with a pair of cab reinforcing caps 86, 88 which are adapted to be secured to the inner ends or end portions of a structural reinforcing rib portion located on the rearward side of the passenger compartment 14, as best seen in FIG. 3, whereby to enhance the appearance of the door assembly 22 once the same has been installed. Additionally, a plurality of three trim members 90, 92 and 94 are adapted to be mounted along the opposite sides and at the lower edge of the generally U-shaped opening which is formed in the front panel of the load-carrying bed section 12. These trim members 90-94 are adapted to be secured by any suitable means, such as screws, bolts, rivets or the like, to the bed section 12 for securing and supporting the front panel sections which are cut away to provide for installation of the assembly 22.

In order to install the door assembly 22 within the rearward side of the cab 14, the seat and seat track assembly are preliminarily removed, after which time, the rear window of the vehicle can be removed. The front bed panel of the load-carrying section 12 is then removed to provide access to the rearward side of the passenger compartment 14. The proper size opening is then formed in the rearward side of the passenger compartment 14, for example, by means of a suitable saw, cutting torch, etc.. The door assembly 22 is thereafter secured in its operative position within the opening that has thus been formed. The front bed panel of the load-carrying section 22 is then cut so as to have the center portion thereof removed, and the vertical side caps or trim strips 90, 92 are placed on the confronting ends of the two half sections of the front bed panel. Similarly, the horizontally extending lower trim strip or cap 94 is mounted upon the bed and the two front bed panels are reinstalled, as are the reinforcement caps 86 and 88. Thereafter, the two windows 78 and 80 are installed on opposite sides of the door assembly 22 and the aforesaid weather sealing 82, 84 is provided therearound. Finally, the interior truck components, i.e., seats, trim, seat belts, etc. are reinstalled to complete the installation of the assembly 22. At such time as the camper enclosure 18 is mounted upon the load-carrying bed section 12, the rearwardly extending section 46 of the bellows assembly 24 is clampingly secured to the flange 47 of the camper to complete the operative connection between the door assembly 22 and the camper enclosure 18.

As will be seen from the foregoing, the present invention provides a novel door assembly adapted for convenient installation on pick-up truck type vehicles, whereby to provide for convenient ingress and egress between the interior of the passenger compartment of the truck and the associated camper enclosure. One particularly important feature of the present invention resides in the fact that the door assembly 22 includes a one-piece door frame which not only provides for convenient assembly and installation, but is extremely pleasant in appearance and adds significantly to the structural integrity of the cab or passenger compartment so as to compensate for any structural portion of the cab that may be removed in order to provide an access opening for the door. Another feature of the present invention resides in the fact that the tempered glass door embodied in the assembly 22 is pivotedly mounted so as to move between a closed position and an open position wherein the door extends into the camper compartment so as to not detract or interfere with the normal passenger space within the passenger compartment. Another feature of the present invention resides in the fact that the flexible bellows seal, which extends entirely around the periphery of the door frame and operatively connects the frame with the associated camper, is connected to the door frame by means of the same sealing arrangement which is utilized to provide a weather-resistant seal around the periphery of the door. This is accomplished without requiring any bonding or mechanical attachment. Another feature of the present invention resides in the fact that no welding is required to install the door assembly 22 in the associated vehicle 10 since the various components of the assembly 22 can be fixedly secured in their operative positions by means of suitable screws, bolts, rivets, etc.. Still another feature of the present invention resides in the fact that the access opening through the door assembly 22 of the present invention extends the full height of the cab, whereby to provide for a convenient movement of a passenger or other person therethrough. Also, the bellows-type seal arrangement will be seen to extend directly between the interior of the passenger compartment and the interior of the camper compartment whereby to provide an effective seal against water leaks, noises, odors, etc.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A door assembly for providing access between the interior of a pick-up type truck passenger compartment or cab and the interior of a camper enclosure mounted on the load-carrying bed of the truck, said door assembly including a one-piece generally rectangular shaped door frame extending substantially the entire height of the cab interior and secured around the periphery thereof to the rearward side of said cab, a door hingedly mounted along a generally vertically extending axis so as to be movable between enclosed position arranged generally coplanar of said rearward side of said cab and an open position extending outwardly into said camper compartment, first sealing means extending between said door frame and said camper enclosure, and second sealing means cooperable with said first sealing means and sealingly engageable with said door when said door is in said closed position.

2. The invention as set forth in claim 1 wherein said first said sealing means comprises a bellows-like seal having a first portion fixedly secured to the rearward end of said door frame and a second portion connected to said camper enclosure.

3. The invention as set forth in claim 2 wherein said door is fabricated of stamped metal and includes a jamb section and a flange portion integrally connected to said jamb section and fixedly secured to said rearward wall of said cab.

4. The invention as set forth in claim 2 wherein said door frame includes a second flange portion extending rearwardly of said jamb section and having said bellows connected thereto.

5. The invention as set forth in claim 1 wherein said door is fabricated entirely of a transparent tempered glass.

6. The invention as set forth in claim 3 wherein said second sealing means is clampingly engageable with said door frame for securing said bellows thereto.

7. The invention as set forth in claim 6 wherein said second sealing means comprises a first portion which is deformable upon engagement with said door to provide a fluidtight seal therebetween, and a second portion clampingly engageable with said flange portion on said door frame for securing said first and second sealing means to said door frame.

8. The invention as set forth in claim 6 wherein said door frame includes forwardly and rearwardly arranged flange portions extending substantially around the periphery of said door frame.

9. The invention as set forth in claim 6 wherein said second sealing means extends entirely around the periphery of said door frame.

10. The invention as set forth in claim 6 wherein said bellows extends entirely around the periphery of said door frame.

11. The invention as set forth in claim 1 which includes a latch assembly mounted on said door for securing said door in said closed position.

12. The invention as set forth in claim 11 wherein said latch assembly includes inner and outer latch portions arranged on the interior and exterior sides, respectively, of said door.

13. The invention as set forth in claim 12 wherein said door is formed with three overlapping apertures adjacent said latch assembly, which includes first and second connecting means extending between said inner and outer latch portions and through the upper and lowermost of said apertures, and a latch actuating shaft extending through the centermost of said apertures.

14. The invention as set forth in claim 1 which includes mechanical means for securing one peripheral edge of said door frame to said rearward wall of said cab.

* * * * *